US012790654B2

(12) United States Patent
Bossung et al.

(10) Patent No.: US 12,790,654 B2
(45) Date of Patent: Nov. 10, 2026

(54) DELAY IGNITOR CAP, BLOWBACK IGNITOR CAP, AND COMBINATION IGNITOR CAP FOR A THERMAL LANCE AND THERMAL LANCES INCLUDING SUCH IGNITOR CAPS

(71) Applicant: Reuning-McKim, Inc., Saxonburg, PA (US)

(72) Inventors: Kyle Bossung, Springdale, PA (US); John W. Bossung, III, Pittsburgh, PA (US); Henry Grabe, Butler, PA (US); Mark D. Kohler, Austin, TX (US); Justin Royle, Natrona Heights, PA (US)

(73) Assignee: Reuning-McKim, Inc., Saxonburg, PA (US)

( * ) Notice: Subject to any disclaimer, the term of this patent is extended or adjusted under 35 U.S.C. 154(b) by 290 days.

(21) Appl. No.: 18/287,203

(22) PCT Filed: Apr. 25, 2023

(86) PCT No.: PCT/US2023/019767
§ 371 (c)(1),
(2) Date: Oct. 17, 2023

(87) PCT Pub. No.: WO2023/211904
PCT Pub. Date: Nov. 2, 2023

(65) Prior Publication Data

US 2025/0075279 A1 Mar. 6, 2025

Related U.S. Application Data

(60) Provisional application No. 63/335,418, filed on Apr. 27, 2022.

(51) Int. Cl.
*C21B 7/12* (2006.01)
*F27D 3/15* (2006.01)

(52) U.S. Cl.
CPC .............. *C21B 7/12* (2013.01); *F27D 3/1527* (2013.01)

(58) Field of Classification Search
CPC ........ C21B 7/12; F27D 3/1527; C21C 5/4653
See application file for complete search history.

(56) References Cited

U.S. PATENT DOCUMENTS

| | | | |
|---|---|---|---|
| 4,423,855 | A | 1/1984 | Kallenbach |
| 4,450,986 | A | 5/1984 | Harasym et al. |

(Continued)

FOREIGN PATENT DOCUMENTS

| | | | |
|---|---|---|---|
| EP | 1343947 | B1 | 2/2006 |
| GB | 668393 | A | 3/1952 |

OTHER PUBLICATIONS

Contessi, "Lighters for thermal lances", https://www.contessi.it/models/thermal-lances-lighting-device/, dowloaded from the internet on May 17, 2026, 2 pages.

(Continued)

*Primary Examiner* — Jessee R Roe
(74) *Attorney, Agent, or Firm* — The Webb Law Firm

(57) ABSTRACT

An ignitor cap for a thermal lance including a proximal end adapted to receive the thermal lance, a distal end, a housing having a sidewall extending from the proximal end to the distal end and defining a passageway, and primary fuel and secondary fuel disposed within the passageway. At least a portion of the primary fuel is in contact with the secondary fuel and/or the distal end is substantially sealed and the proximal end includes at least one opening such that, when the thermal lance is received in the proximal end of the ignitor cap, gas flows axially through the primary fuel and the secondary fuel, and is then redirected by the sealed distal end back through the primary fuel and the secondary fuel and out through the at least one opening and along an (Continued)

exterior surface of the thermal lance. Also, thermal lances including such an ignitor cap.

31 Claims, 10 Drawing Sheets

(56) References Cited

U.S. PATENT DOCUMENTS

| | | | |
|---|---|---|---|
| 4,746,037 | A | 5/1988 | Harasym |
| 4,877,161 | A | 10/1989 | Harasym |
| 4,915,618 | A | 4/1990 | Brandin |
| 5,622,672 | A | 4/1997 | Swick et al. |
| 7,052,646 | B2 | 5/2006 | Ericksson et al. |
| 7,537,723 | B2 | 5/2009 | Harasym |
| 7,563,407 | B2 | 7/2009 | Harasym |
| 11,187,461 | B2 | 11/2021 | Harasym |
| 2018/0334873 | A1 | 11/2018 | Marya |
| 2020/0318208 | A1 | 10/2020 | Harasym |
| 2020/0318907 | A1 | 10/2020 | Harasym |

OTHER PUBLICATIONS

Ferrox, “Safety Igniter—Safety Data Sheet”, 2013, Solna, Sweden, 7 pages.

Oxy-Start, “Linden Flyer Oxystart-Thermic Igniter”, 2007, Marienheide-Dannenberg, Germany, 2 pages.

DELAY IGNITOR CAP, BLOWBACK IGNITOR CAP, AND COMBINATION IGNITOR CAP FOR A THERMAL LANCE AND THERMAL LANCES INCLUDING SUCH IGNITOR CAPS

CROSS-REFERENCE TO RELATED APPLICATION

This application is the United States national phase of International Application No. PCT/US23/19767 filed Apr, 25. 2023, and claims priority to U.S. Provisional Patent Application No. 63/335,418 filed Apr. 27, 2022, the disclosures of each of which are hereby incorporated by reference in their entireties.

BACKGROUND OF THE INVENTION

Field of the Invention

The present invention is directed to ignitor caps for ignition of thermal lances and lances including such ignitor caps, and more specifically, an ignitor cap that includes features to direct the heat energy from the ignitor cap along the exterior surface of the thermal lance, an ignitor cap that provides delayed ignition of the thermal lance, an ignitor cap that performs both functions, and thermal lances including such ignitor caps.

Description of Related Art

In the metals industry, vessels, such as furnaces, ladles, tundishes, and rail cars, are used to melt, hold, and transport molten ferrous and non-ferrous metals. These vessels have discharge ports of various shapes and orientations that are used to discharge molten metal from the inside of the vessel. During normal operation, these discharge ports can become clogged or blocked. The industry standard is to use thermal lances to burn through the blockage and unclog the discharge port. U.S. Pat. Nos. 4,450,986; 4,746,037; 4,877,161; 7,537,723; 7,563,407; and 11,187,461 and United States Patent Application Publication No. 2020/0318208 are directed to such thermal lances and methods of using them to unclog such discharge ports.

Although the use of thermal lances with and without auxiliary ignitors has been standard practice in the metals industry, there are many issues with respect to the reliability of thermal lance ignition.

Thermal lances are primarily composed of low carbon steel and sometimes contain magnesium or tungsten rods. These solid metallic components require a substantial amount of energy input for combustion to occur. Increasing the thermal energy from ambient conditions to levels required for combustion is difficult.

For effective and reliable ignition and combustion of the thermal lance, there are several factors that must be considered including the significant amount of energy needed for ignition, the sensitivity of the ignition process to oxygen flow, and the provision of sufficient energy after ignition. Further, the process is not easily automated and generally requires a human operator to physically ignite the thermal lance or the provision of an auxiliary ignitor that is not integrated into the lance. This lack of automation raises concerns about the safety and ergonomics of the process for the operator.

The standard practice of ignition (starting combustion) is to submerge the end of a thermal lance into molten metal, while at the same time applying a low flow of oxygen. Oxygen flow is often controlled by a non-precise trigger valve, and a trained operator is required to provide the correct flow of oxygen through the entire process. This method of ignition is physically dangerous and difficult to control.

To increase the reliability of combustion of the thermal lance, an ignition/combustion chain of one or more additional fuels is often used. The fuels may be provided in an auxiliary ignitor that can contain two stages of fuel. The primary fuel is the easiest to ignite and is a material with a very low auto-ignition temperature, such that it takes a relatively small amount of thermal energy for this material to begin combustion and start the ignition/combustion chain. However, combustion of this material occurs quickly, only lasts a short period of time, and does not generate enough energy to ignite the solid metallic components of the thermal lance. A secondary fuel with intermediate ignition energy requirements is needed to bridge the gap. The primary fuel generates enough thermal energy to start the combustion of the secondary fuel. The secondary fuel combusts for a longer period of time and provides a more exothermic combustion reaction, thereby generating more thermal energy than the primary fuel. Theoretically, the secondary fuel generates enough thermal energy to start the combustion of the solid metallic components of the thermal lance.

If the primary stage fuel is a fireworks-type fuse, exposure of the fuse to a high temperature environment is required for ignition. In the molten metals industry, there is not always enough temperature present to perform this task.

If the primary stage fuel is a powdered material with a low ignition energy requirement, for example, very finely powdered zirconium, a high flow of 100% pure oxygen is required for ignition. More specifically, a precise concentration of powder and 100% oxygen within an internal chamber is required for spontaneous combustion of the powder. This concentration is exceedingly hard to achieve reliably within the metals industry.

If the primary stage fuel is a firing cap, similar to that used in ammunition, the movement of a secondary component is required to strike the firing cap in the exact, correct location. Controlling the speed, orientation, and position of this striking component is difficult to achieve reliably within the metals industry In all three of these ignition methods, the primary fuel must ignite successfully, generate enough energy, and have the capacity to transfer this energy to the secondary fuel to continue the ignition/combustion chain.

Thus, there are a number of problems with prior art thermal lances with or without an auxiliary ignitor. These problems include reliable ignition of the ignition/combustion chain, premature ignition, lack of sufficient time during ignition to allow the operator to start the flow of oxygen and position the thermal lance in the discharge port, and reliable ignition of the thermal lance itself. The present invention addresses all of these problems.

SUMMARY OF THE INVENTION

The present invention is directed to a blowback ignitor cap for a thermal lance comprising a proximal end adapted to receive the thermal lance, a distal end, a housing having a sidewall extending from the proximal end to the distal end and defining a passageway, and internal primary fuel and secondary fuel disposed within the passageway of the housing. The distal end of the blowback ignitor cap is substantially sealed and the proximal end of the blowback ignitor cap includes at least one opening such that, when the thermal lance is received in the proximal end of the blowback ignitor cap, gas flows from the thermal lance into the proximal end of the blowback ignitor cap, axially through the internal primary fuel and the secondary fuel, and is then redirected by the sealed distal end of the housing back through the internal primary fuel and the secondary fuel and out through the at least one opening and along an exterior surface of the thermal lance.

A plug may cover the distal end of the blowback ignitor cap, thereby substantially sealing the distal end of the blowback ignitor cap.

The blowback ignitor cap may further comprise an attachment ring that includes or defines the at least one opening. The attachment ring may have a central opening for receiving the thermal lance. The at least one opening may be a hole or aperture passing through the attachment ring or the attachment ring is segmented with the at least one opening being provided between the segments. The attachment ring may be fixedly attached to the thermal lance.

The blowback ignitor cap may further comprise an opening in the distal end through which a fuse passes and/or a porous barrier filling a portion of the passageway of the housing and acting as a divider between the primary fuel and/or secondary fuel and a distal end of the thermal lance when the thermal lance is received in the blowback ignitor cap.

The present invention is also directed to a delay ignitor cap for a thermal lance comprising a proximal end adapted to receive the thermal lance, a distal end, a housing having a sidewall extending from the proximal end to the distal end and defining a passageway, and internal primary fuel and secondary fuel disposed within the passageway of the housing. The internal primary fuel surrounds the secondary fuel.

The internal primary fuel and/or the secondary fuel may be porous or include openings to allow gas to flow from the proximal end of the delay ignitor cap to the distal end of the delay ignitor cap when the delay ignitor cap is attached to the thermal lance. The secondary fuel may be a central core within the passageway of the housing and the internal primary fuel may be provided in the form of a helix or coil that is positioned between the sidewall of the housing and the secondary fuel and surrounds the secondary fuel.

The internal primary fuel may comprise a protected portion that is separated from the secondary fuel by a sheath that prevents and/or reduces cross-ignition of the internal primary fuel with the secondary fuel, and an unprotected portion that is directly in contact with the secondary fuel. The protected portion of the internal primary fuel may have a higher volume of fuel than the unprotected portion of the internal primary fuel.

A porous barrier filling a portion of the passageway of the housing and acting as a divider between the primary fuel and/or secondary fuel and a distal end of the thermal lance when the thermal lance is received in the ignitor cap may be provided.

The delay ignitor cap may further comprise a recess in the proximal end of the housing for receiving the thermal lance, such that a distal end of the thermal lance is adjacent to or contacts the internal primary fuel and/or the secondary fuel and a fuse extending from the internal primary fuel out of the distal end of the delay ignitor cap.

The delay ignitor cap may further comprise external primary fuel provided on an exterior of the housing between the fuse and the internal primary fuel. The external primary fuel may be provided as a coil or helix and may be surrounded by a sheath that prevents combustion of one portion of the external primary fuel from igniting another portion of the external primary fuel and/or from igniting the housing.

The present invention is also directed to a combination ignitor cap for a thermal lance comprising a proximal end adapted to receive the thermal lance, a distal end, a housing having a sidewall extending from the proximal end to the distal end and defining a passageway, and internal primary fuel and secondary fuel disposed within the passageway of the housing. The distal end of the combination ignitor cap is substantially sealed and the proximal end of the combination ignitor cap includes at least one opening such that, when the thermal lance is received in the proximal end of the combination ignitor cap, gas flows from the thermal lance into the proximal end of the combination ignitor cap, axially through the internal primary fuel and the secondary fuel, and is then redirected by the sealed distal end of the housing back through the internal primary fuel and the secondary fuel and out through the at least one opening and along an exterior surface of the thermal lance. The internal primary fuel surrounds the secondary fuel.

The internal primary fuel and/or the secondary fuel may be porous or include openings to allow gas to flow from the proximal end of the combination ignitor cap to the distal end of the combination ignitor cap when the combination ignitor cap is attached to the thermal lance. The secondary fuel may be a central core within the passageway of the housing and the internal primary fuel may be provided in the form of a helix or coil that is positioned between the sidewall of the housing and the secondary fuel and surrounds the secondary fuel.

The internal primary fuel may comprise a protected portion that is separated from the secondary fuel by a sheath that prevents and/or reduces cross-ignition of the internal primary fuel with the secondary fuel and an unprotected portion that is directly in contact with the secondary fuel. The protected portion of the internal primary fuel may have a higher volume of fuel than the unprotected portion of the internal primary fuel.

The combination ignitor cap may further comprise external primary fuel provided on an exterior of the housing between the fuse and the internal primary fuel. The external primary fuel may be provided as a coil or helix and may be surrounded by a sheath that prevents combustion of one portion of the external primary fuel from igniting another portion of the external primary fuel and/or from igniting the housing.

A plug may cover the distal end of the combination ignitor cap thereby substantially sealing the distal end of the combination ignitor cap.

The combination ignitor cap may further comprise an attachment ring that includes or defines the at least one opening. The attachment ring may have a central opening for receiving the thermal lance. The at least one opening may be a hole or aperture passing through the attachment ring or the attachment ring is segmented with the at least one opening being provided between the segments. The attachment ring may be fixedly attached to the thermal lance.

The combination ignitor cap may further comprise an opening in the distal end through which a fuse passes and/or a porous barrier filling a portion of the passageway of the housing and acting as a divider between the primary fuel and/or secondary fuel and a distal end of the thermal lance when the thermal lance is received in the combination ignitor cap.

The present invention is also directed to a thermal lance system comprising the delay ignitor cap, the blowback ignitor cap, or the combination ignitor cap and a thermal lance. A distal end of the thermal lance is received in a proximal end of the ignitor cap.

When a blowback ignitor cap or a combination ignitor cap is provided, a tertiary fuel may be provided in the thermal lance adjacent the secondary fuel of the ignitor cap. The tertiary fuel may have a higher energy density than the secondary fuel and/or a lower initial energy requirement for combustion than components of the thermal lance.

DESCRIPTION OF THE INVENTION

As used herein, the terms “comprising” and “including” are open-ended, have the same meaning, and may be synonymous with “containing” or “characterized by”. Any numerical values are expressed using a period as a decimal point and a comma as a thousand separator, for example, 1,234 would be one thousand two hundred thirty four, and 1.2 would be one and two tenths. Unless otherwise expressly specified, all numbers such as those expressing values, ranges, amounts or percentages may be read as if prefaced by the word “about”, even if the term does not expressly appear. Any numerical range recited herein is intended to include all sub-ranges subsumed therein. For example, a range of “1 to 10” is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Plural encompasses singular and vice versa. When ranges are given, any endpoints of those ranges and/or numbers within those ranges can be combined with the scope of the present invention. “Including”, “such as”, “for example”, and like terms mean “including/such as/for example but not limited to”.

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawings, figures, or otherwise described herein are simply exemplary and should not be considered as limiting.

Figure 15:
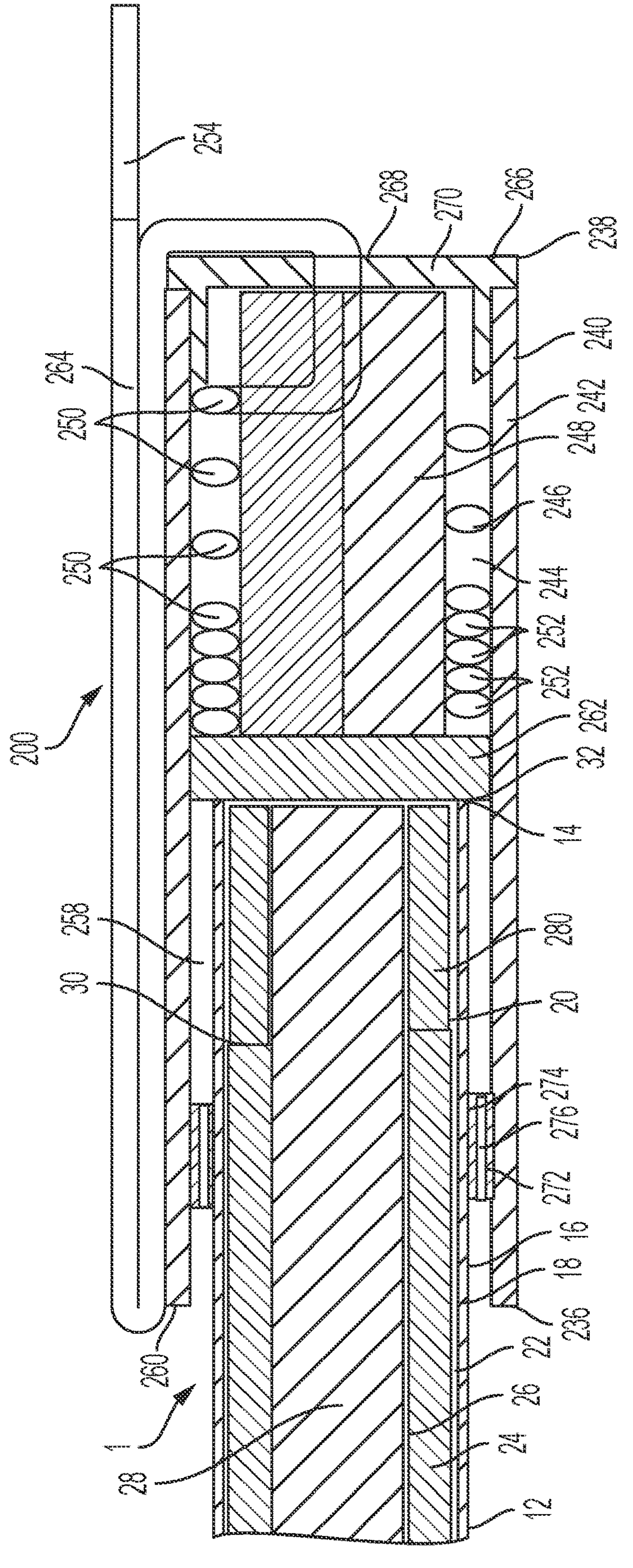
FIG. 15 is a longitudinal cross-sectional view of a combination ignitor cap according to the invention.
Figure 16:
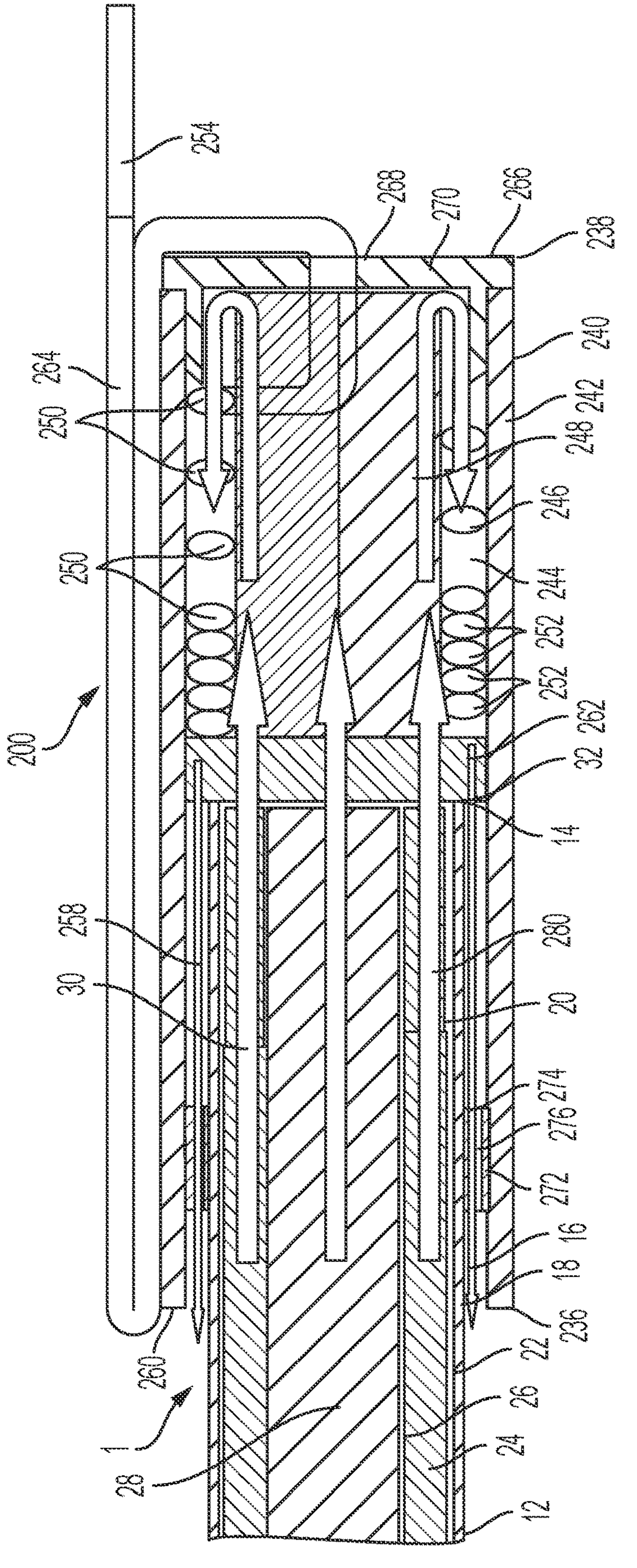
FIG. 16 is a longitudinal cross-sectional view of a combination ignitor cap of FIG. 15 with arrows showing the flow of oxygen.

The present invention is directed to a blowback ignitor cap 100 for a thermal lance 1 (FIGS. 1 and 2), a thermal lance system including a blowback ignitor cap 100 (FIGS. 1 and 2), a delay ignitor cap 10 for a thermal lance 1 (FIG. 5), a thermal lance system including a delay ignitor cap 10 (FIG. 5), a combination ignitor cap 200 having both the features of the delay ignitor cap 10 and the blowback ignitor cap 100 (FIGS. 15 and 16), and a thermal lance system including the combination ignitor cap 200 (FIGS. 15 and 16). The thermal lance may be used for melting metal and, more specifically, for melting metal to open a tap hole in a steelmaking or other metal production vessel.

As shown in FIGS. 1, 2, 5, 15, and 16, the thermal lance 1 comprises an outer housing 16 having a sidewall 18 extending from a proximal end 12 of the thermal lance 1 to a distal end 14 of the thermal lance 1 and defining a passageway 20 and an inner housing 22 having a sidewall 24 defining a passageway 26, where the inner housing 22 is contained within the outer housing 16. A central core 28 comprising one or more passageways is contained within the passageway 26 of the inner housing 22. The inner housing 22 may have a length that is shorter than a length of the outer housing 16 such that a distal end 30 of the inner housing 22 is located within the passageway 20 of the outer housing 16 and spaced proximally from a distal end 32 of the outer housing 16. The central core 28 may extend beyond the distal end 30 of the inner housing 22 and into the passageway 20 of the outer housing 16.

The outer housing 16 and the inner housing 22 may be a substantially cylindrical tube, and a sidewall 18 of the inner housing 22 may be concentric with the sidewall 18 of the outer housing 16. The central core 28 may have a substantially cylindrical outer surface and may fill the passageway 26 of the inner housing 22. In one embodiment, the central core 28 has a spiral shape in which layers of material are wound around a central axis. The spiral shape defines several concentric passageways through the central core 28.

The outer housing 16, inner housing 22, and central core 28 may be made of any suitable metal or metal sheet, including, but not limited to, stainless steel, low carbon steel, high carbon steel, alloy steel, magnesium, tungsten, and combinations thereof.

The proximal end 12 of the thermal lance 1 has a fitting to which a gas source is attached to the thermal lance 1 such that the gas flows from the proximal end 12 of the thermal lance 1 through the central core 28 and out of the distal end 14 of the thermal lance 1. The gas may also flow through any spaces provided between the outer housing 16 and the inner housing 22 and/or the inner housing 22 and the central core 28. The gas may be any gas containing oxygen that is suitable for enhancing combustion. The gas will be referred to as oxygen herein.

The distal end 14 of the thermal lance 1 may include a cap 34 for concentrating the flow of oxygen. The cap 34 may have a substantially conical shape that narrows the passageway 20 of the outer housing 16 and reduces the size of the distal end 14 of the thermal lance 1.

The thermal lance 1 may also telescope to increase its length as described in U.S. Pat. Nos. 4,450,986; 4,746,037; and 4,877,161 incorporated in their entirety herein by reference.

In use, the distal end 14 of the thermal lance 1 is ignited and the components of the thermal lance 1 are consumed by the combustion reaction from the heat of the ignition and the oxygen flowing through the thermal lance 1.

The inventive blowback ignitor cap 100 is attached to the distal end 14 of the thermal lance 1.

Figure 1:
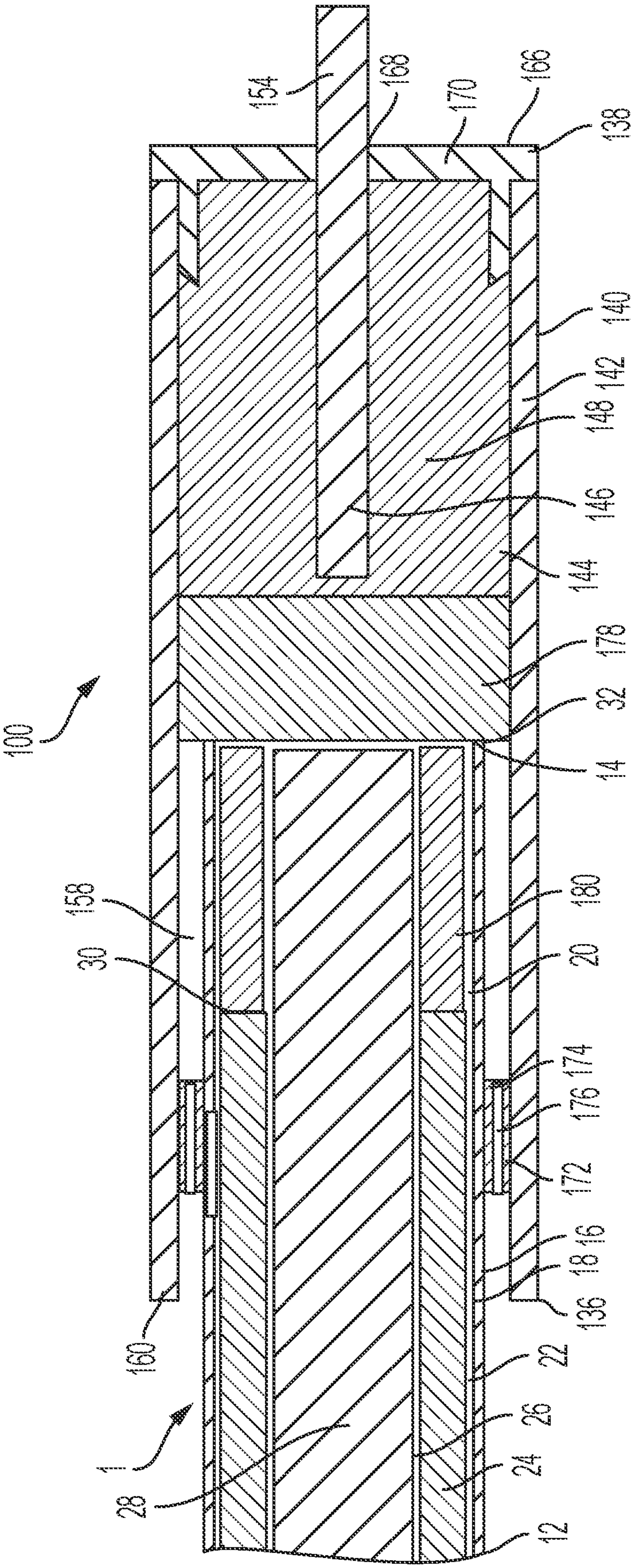
FIG. 1 is a longitudinal cross-sectional view of a blowback ignitor cap according to the invention.
Figure 2:
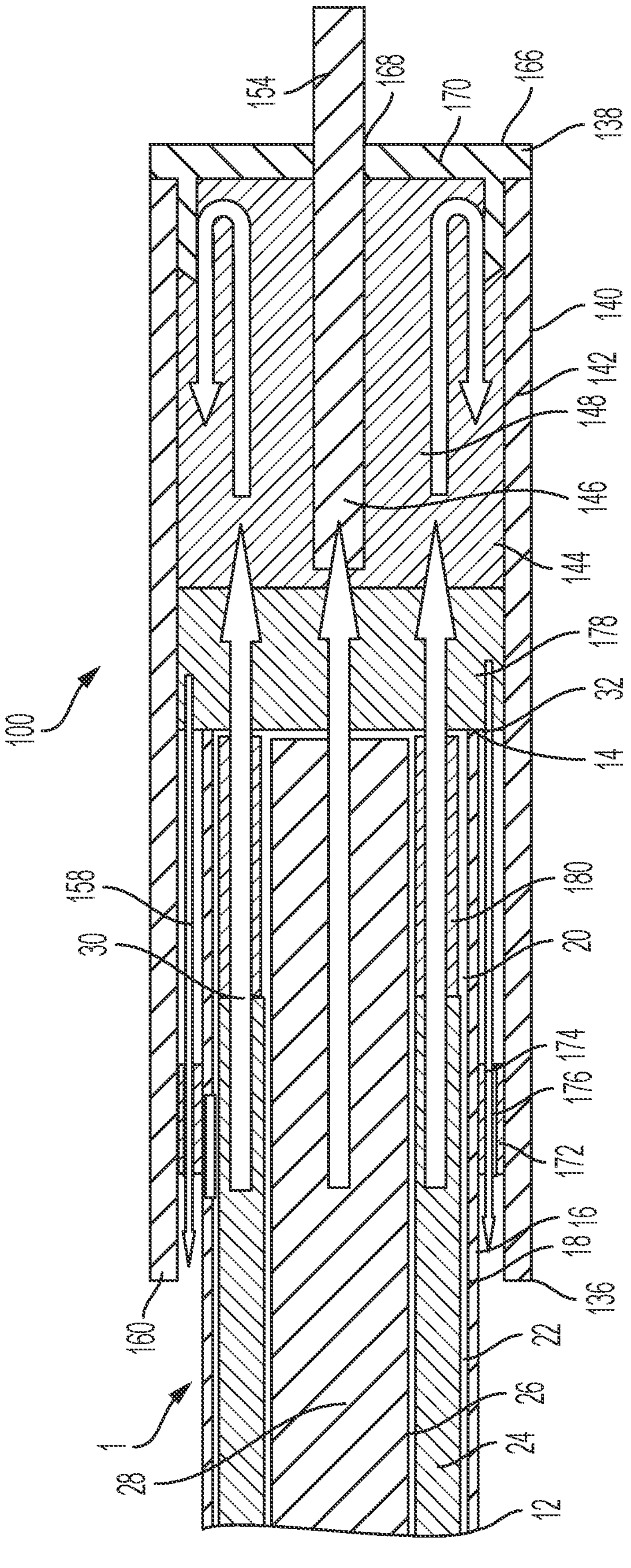
FIG. 2 is a longitudinal cross-sectional view of a blowback ignitor cap of FIG. 1 with arrows showing the flow of oxygen.

As shown in FIGS. 1 and 2, the blowback ignitor cap 100 comprises a proximal end 136, a distal end 138, a housing 140 having a sidewall 142 extending from the proximal end 136 to the distal end 138 and defining a passageway 144, and internal primary fuel 146 and secondary fuel 148 disposed within the passageway 144 of the housing 140. The internal primary fuel 146 and the secondary fuel 148 may be any suitable combustible materials capable of ignition in the presence of oxygen including, but not limited to, fireworks fuse; artillery fuse; metallic powders of aluminum, iron, titanium, magnesium, tungsten, and/or steel; non-metallic powders of wood, plastic, and/or synthetic material; metallic shavings or thin strips of aluminum, iron, titanium, magnesium, tungsten, and/or steel; steel wool; synthetic or organic foam; synthetic or organic textile; and a chemical mixture composed of a high energy oxidizer and fuel. The internal primary fuel 146 and/or the secondary fuel 148 are porous to allow oxygen from the thermal lance 1 to flow from the proximal end 136 of the blowback ignitor cap 100 to the distal end 138 of the blowback ignitor cap 100 when the blowback ignitor cap 100 is attached to the thermal lance 1.

The internal primary fuel 146 and the secondary fuel 148 may positioned within the passageway with respect to one another in any suitable arrangement in which at least a portion of the internal primary fuel 146 contacts the secondary fuel 148. For example, in one embodiment, as shown in FIGS. 1 and 2, the secondary fuel 148 surrounds the internal primary fuel 146.

A distal end 166 of the housing 140 is substantially sealed and may be provided with an opening 168 that allows a fuse 154 to pass therethrough. The distal end 166 of the housing 140 may be sealed in any suitable manner that substantially prevents oxygen flowing from the proximal end 136 of the blowback ignitor cap 100 to the distal end 138 of the blowback ignitor cap 100 from flowing out of the distal end 138 of the blowback ignitor cap 100.

A plug or cap 170 may cover the distal end 166 of the housing 140 of the blowback ignitor cap 100, such that the distal end 166 of the housing 140 is sealed. The plug 170 may be made of any suitable combustible material that can be secured tightly to the distal end 166 of the housing 140. Such materials include, but are not limited to, steel, stainless steel, iron, wood, cardboard, rubber, cork, plastic, tape, and other metallic, synthetic, or organic material.

Alternatively, the distal end 166 of the housing 140 of the blowback ignitor cap 100 may be sealed by forming, crimping, welding, riveting, hammering, or bending.

A recess 158 for receiving the thermal lance 1 is provided in a proximal end 160 of the housing 140 of the blowback ignitor cap 100. An attachment ring 172 having a central opening 174 for receiving the thermal lance 1 is provided in the recess 158 of the housing 140. The attachment ring 172 includes at least one opening 176 that allows oxygen to flow through the attachment ring 172 and between the thermal lance 1 and the housing 140 of the blowback ignitor cap 100.

The at least one opening 176 in the attachment ring 172 may be provided as a hole or aperture passing through the attachment ring 172 or the attachment ring 172 may be segmented with an opening 176 provided between the segments. When a plurality of openings 176 are provided, the openings 176 may be equally spaced around the attachment ring 172, for example, at 180° (2 openings), 120° (3 openings), 90° (4 openings), or 45° (8 openings) or may be provided at different distances from one another.

In the blowback ignitor cap 100, as shown in FIGS. 1 and 2, the oxygen flows from the thermal lance 1 into the proximal end 136 of the blowback ignitor cap 100, axially through the internal primary fuel 146 and the secondary fuel 148, and is then redirected by the sealed distal end 166 of the housing 140 axially back through the internal primary fuel 146 and the secondary fuel 148 and out through the openings 176 in the attachment ring 172.

The total surface area of the openings 176 in the attachment ring 172 is larger than any gap between the fuse 154 and the opening 168 in the distal end 166 of the housing 140, so that the majority of the oxygen exits through the proximal end 136 of the blowback ignitor cap 100 and along the outer surface of the outer housing 16 of the thermal lance 1.

The attachment ring 172 may be made of any suitable material that allows for the secure attachment of the attachment ring 172 to the housing 140 of the blowback ignitor cap 100 and the outer housing 16 of the thermal lance 1. Such materials include metals, organics, plastics, ceramics, and rubbers. The attachment of the attachment ring 172 to the housing 140 of the blowback ignitor cap 100 and the outer housing 16 of the thermal lance 1 may be accomplished by any suitable method that assures that the blowback ignitor cap 100 will not be detached from or move with respect to the thermal lance 1 by the gas pressure of the oxygen impacting the sealed distal end 166 of the housing 140 of the blowback ignitor cap 100 or by the blowback ignitor cap 100 impacting a solid object. Such methods include, but are not limited to, welding, crimping, pressing, pinning, riveting, rubber inserts, metallic inserts, springs, clips, pins, interlocking geometric shapes, and corresponding threaded connections.

The fuse 154 extends from the internal primary fuel 146 out of the distal end 166 of the blowback ignitor cap 100. The fuse 154 may be manually ignited using a torch, a lighter, or a hot element or any other suitable ignition source or may be spontaneously ignited when exposed to temperatures or surfaces above the auto-ignition temperature of the fuse 154 to start combustion of the internal primary fuel. Combustion of the internal primary fuel 146 proceeds along a path through the internal primary fuel 146, and ignites the secondary fuel 148.

Optionally, a porous barrier 178 may be provided to separate the thermal lance 1 from the secondary fuel 148. The barrier can be made of any suitable material that fits snugly into the housing 140 of the blowback ignitor cap 100, is porous to allow the flow of oxygen therethrough, and has a porosity that is fine enough to contain the secondary fuel 148. Such materials include, but are not limited to, cloth, metal, synthetic resin, or foam.

Optionally, a tertiary fuel 180 may be provided between the central core 28 and the outer housing 16 of the thermal lance 1 where the tertiary fuel 180 is intermingled with the components of the thermal lance 1. The tertiary fuel 180 may have a higher energy density than the secondary fuel 148 and/or a lower initial energy requirement for combustion than the components of the thermal lance 1. The tertiary fuel 180 may be, for example, compressed metallic flakes, powder or shavings, steel wool, non-metallic powder of wood, plastic or synthetic material, high-density synthetic or organic foam, or high-density synthetic or organic textile. The tertiary fuel 180 is ignited by the combustion of the secondary fuel 148 and assists in ignition of the components of the thermal lance 1.

The inventive blowback ignitor cap 100 provides a number of advantages over prior art ignitor caps.

As discussed above, when the distal end of the ignitor cap is not sealed, the oxygen flows in one direction axially along the length of the ignitor cap and out the distal end of the ignitor cap. In this case, the oxygen primarily interacts with the internal surface of the housing of the thermal lance 1. With this contact, there is often enough fuel and oxygen present for combustion of the thermal lance 1 to occur but it is difficult to reliably provide enough heat energy to all of the components of the thermal lance 1 for combustion to begin. This is magnified when high oxygen pressure and flow is used, and therefore, the combustion reaction requires low pressure oxygen to react reliably.

Figure 4:
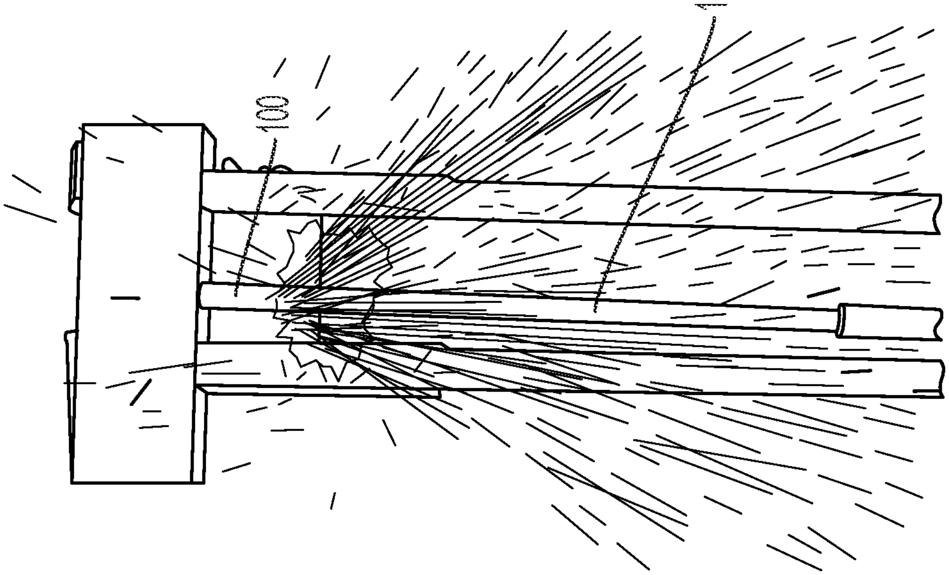
FIG. 4 is a side view of a thermal lance having the inventive blowback ignitor cap in operation.
Figure 3:
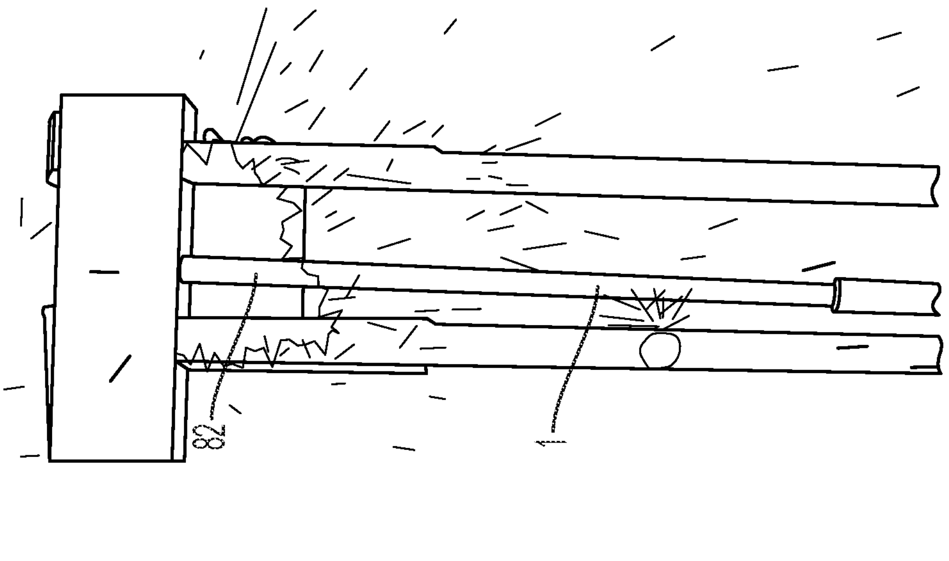
FIG. 3 is a side view of a thermal lance having an ignitor cap with an open distal end in operation.

The dependence on low pressure/low flow oxygen can be reduced if the surface area of the thermal lance 1 that is exposed to oxygen and the heat energy are increased. As shown in FIGS. 1 and 2, with the blowback ignitor cap 100 having the sealed distal end 166, oxygen exiting the thermal lance 1 interacts with the internal primary fuel 146 and the secondary fuel 148 and is then forced to reverse direction and exit the blowback ignitor cap 100 along the exterior surface of the thermal lance 1. This exposes the exterior surface of the thermal lance 1 to the oxygen flow enhancing combustion of the thermal lance 1. This flow path is highlighted in FIGS. 3 and 4, which show the difference in the spark profile exiting the housing of the ignitor caps. As can be seen in FIG. 3, for an ignitor cap 82 in which the distal end is open, the sparks are directed out of the distal end of the ignitor cap 82, while, as shown in FIG. 4, for the blowback ignitor cap 100 in which the distal end 166 is sealed, the sparks are directed out of the proximal end 136 of the blowback ignitor cap 100 along the exterior surface of the thermal lance 1.

Further, with the oxygen flow in the blowback ignitor cap 100, heat energy generated from the combustion of the internal primary fuel 146 and the secondary fuel 148 follows the flow path of the oxygen and is directed toward the thermal lance 1 instead of away from the thermal lance 1. This increases the rate of heat transfer between the fuels 146,148 and the components of the thermal lance 1. This pre-heating effect increases the reliability of complete ignition of the thermal lance 1.

In addition, direct integration of the blowback ignitor cap 100 into the thermal lance 1, instead of as a separate component, increases the ease of operation and the reliability of complete ignition of the thermal lance 1. Inventory management is streamlined, two components are reduced to one, and there is a higher chance that the thermal lance 1 will be used correctly.

Prior art ignitor caps are optimized for the ignition of the primary fuel and are not designed to enhance heat transfer to the thermal lance 1 itself. The inventive thermal lance system with the inventive blowback ignitor cap 100 consolidates the ignitor and the thermal lance 1 into one device that has congruent heat transfer through all stages of fuel ignition and optimizes combustion along every step.

Further, integrating the inventive blowback ignitor cap 100 directly into the thermal lance 1 allows tertiary fuel 180 to be used. The secondary fuel 148 need only generate enough heat energy to ignite the tertiary fuel 180. When ignited, the tertiary fuel 180 generates heat energy as close as possible to the thermal lance 1 components. This maximizes the efficiency of heat transfer to the thermal lance 1 components. Prior art ignitor caps and thermal lances only rely on heat energy from the primary fuel and the secondary fuel, which are physically separated from the thermal lance components.

The inventive delay ignitor cap 10 is attached to distal end 14 of the thermal lance 1.

Figure 5:
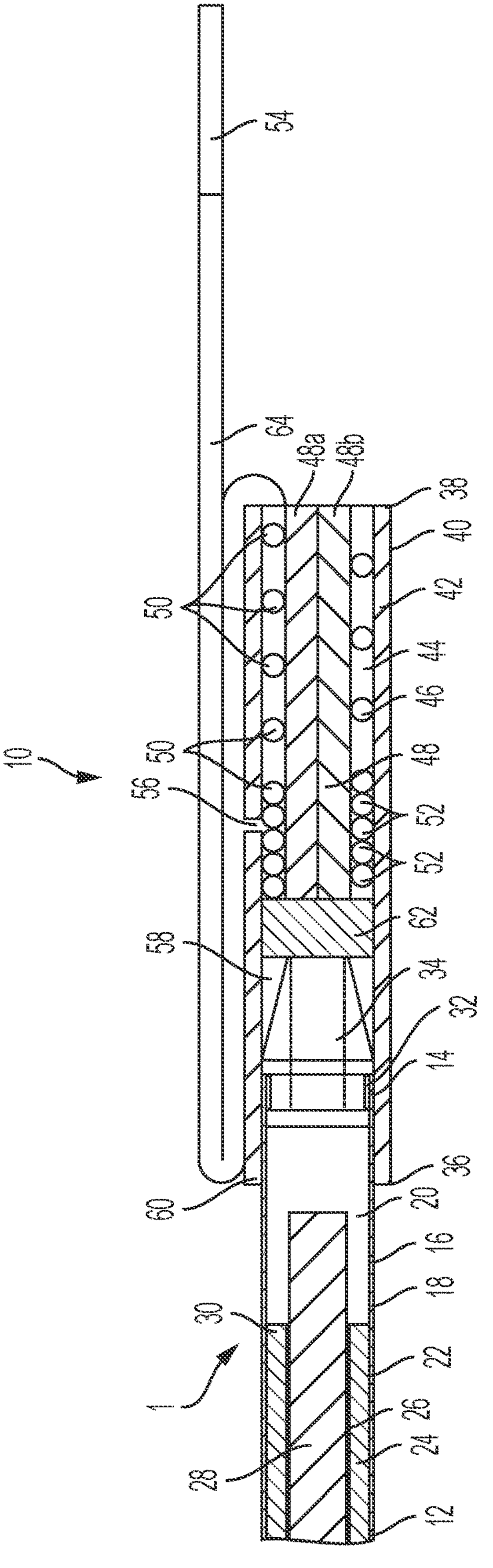
FIG. 5 is a longitudinal cross-sectional view of a delay ignitor cap according to the invention.

As shown in FIG. 5, the delay ignitor cap 10 comprises a proximal end 36, a distal end 38, a housing 40 having a sidewall 42 extending from the proximal end 36 to the distal end 38 and defining a passageway 44, and internal primary fuel 46 and secondary fuel 48 disposed within the passageway 44 of the housing 40.

The internal primary fuel 46 and the secondary fuel 48 may be any suitable combustible materials capable of ignition in the presence of oxygen including, but not limited to, fireworks fuse, artillery fuse, metallic powders of aluminum, iron, titanium, magnesium, tungsten, and/or steel; non-metallic powders of wood, plastic, and/or synthetic material; metallic shavings or thin strips of aluminum, iron, titanium, magnesium, tungsten, and/or steel; steel wool; synthetic or organic foam; synthetic or organic textile; and a chemical mixture composed of a high energy oxidizer and fuel. The internal primary fuel 46 and/or the secondary fuel 48 are porous or include openings to allow oxygen to flow from the proximal end 36 of the delay ignitor cap 10 to the distal end 38 of the delay ignitor cap 10 when the delay ignitor cap 10 is attached to the thermal lance 1.

Within the housing 40, the internal primary fuel 46 surrounds the secondary fuel 48. As shown in FIG. 5, the secondary fuel 48 may be a central core within the passageway 44 of the housing 40 and the internal primary fuel 46 may be provided in the form of a helix or coil that is positioned between the sidewall 42 of the housing 40 and the secondary fuel 48 and surrounds the secondary fuel 48. The rotations of the helix may be wound such that the rotations are spaced apart or such that the rotations of the helix contact one another. As an example, as shown in FIG. 5, the rotations of the helix in a protected portion 50 of the internal primary fuel 46 may be spaced apart from one another while the rotations of an unprotected portion 52 of the internal primary fuel 46 may contact one another.

The secondary fuel 48 may comprise more than one portion. For example, as shown in FIG. 5, the secondary fuel 48 may comprise two or more substantially cylindrical portions 48*a*, 48*b* extending in the longitudinal direction of the passageway 44 of the housing 40. Alternatively, the internal primary fuel 46 may completely fill the space between the sidewall 42 of the housing 40 and the secondary fuel 48 and/or the secondary fuel 48 may be a material that completely fills a space within the housing 40 defined by the internal primary fuel 46.

A fuse 54 extends from the internal primary fuel 46 out of the distal end 38 of the delay ignitor cap 10. The fuse 54 may be manually ignited using a torch, a lighter, a hot element, or any other suitable ignition source or may be spontaneously ignited when exposed to temperatures or surfaces above the auto-ignition temperature of the fuse 54 to start combustion of the internal primary fuel. Combustion of the internal primary fuel 46 proceeds along a path through the internal primary fuel 46, and when the combusting internal primary fuel 46 comes into contact with the secondary fuel 48, the secondary fuel 48 is ignited and starts to combust.

The protected portion 50 of the internal primary fuel 46 may be separated from the secondary fuel 48 by a sheath that prevents and/or reduces cross-ignition of the internal primary fuel 46 with the secondary fuel 48 while still allowing the secondary fuel 48 to be heated by the combustion of the protected portion 50 of the internal primary fuel 46. An unprotected portion 52 of the internal primary fuel 46 is directly in contact with the secondary fuel 48, such that ignition and combustion of the unprotected portion 52 of the internal primary fuel 46 ignites of the secondary fuel 48. The protected portion 50 of the internal primary fuel 46 may also prevent the entirety of the internal primary fuel 46 from igniting at the same time. For example, when the internal primary fuel 46 is a helix, as shown in FIG. 5, the sheath surrounding the protected portion 50 of the internal primary fuel 46 contains the ignition and combustion of the internal primary fuel 46 such that ignition and combustion of the internal primary fuel 46 follows the path of the helix and does not jump from one rotation of the helix to an adjacent rotation of the helix. Once the combustion of the internal primary fuel 46 reaches the unprotected portion 52 of the internal primary fuel 46, cross-ignition of all of the rotations of the helix of the unprotected portion 52 can occur at the same time and ignite the secondary fuel 48.

The protected portion 50 of the internal primary fuel 46 may be a higher volume of fuel than the unprotected portion 52 of the internal primary fuel 46. For example, when the internal primary fuel 46 is a helix or coil, as shown in FIG. 5, the protected portion 50 of the internal primary fuel 46 includes more rotations of the helix than the unprotected portion 52 of the internal primary fuel 46.

In the embodiment shown in FIG. 5, the housing 40 may be a phenolic resin tube, the internal primary fuel 46 may be a fuse, and the secondary fuel 48 may be steel wool.

The sidewall 42 of the housing 40 includes a vent hole 56 and may have a substantially cylindrical shape.

The housing 40 may be made of any suitable combustible material that has the structural integrity to contain the internal primary fuel 46 and the secondary fuel 48 and attach the delay ignitor cap 10 to the thermal lance 1. Such materials include, but are not limited to, a phenolic resin, cardboard, plastic, low carbon steel, high carbon steel, stainless steel, and fiberglass.

A recess 58 may be provided in a proximal end 60 of the housing 40 of the delay ignitor cap 10. In use, the thermal lance 1 is inserted into the recess 58 of the housing 40 of the delay ignitor cap 10 until the distal end 14 of the thermal lance 1 is adjacent to or contacts the internal primary fuel 46 and/or the secondary fuel 48. The inner dimensions of the recess 58 may correspond to the outer dimensions of the housing 40 of the delay ignitor cap 10 providing a friction fit between the delay ignitor cap 10 and the thermal lance 1. Alternatively, the delay ignitor cap 10 may be attached to the thermal lance 1 using any suitable method including, but not limited to, welding, riveting, gluing, compression forming, such as crimping or pressing, frictional fit, rubber inserts, metallic inserts, springs, clips, pins, interlocking geometric shapes, and corresponding threaded connections.

As shown in FIG. 5, a plug 62 of the secondary fuel 48 may fill the passageway 44 of the housing 40 and act as a divider between the fuel 46, 48 of the delay ignitor cap 10 and the distal end 14 of the thermal lance 1.

Optionally, external primary fuel 64 may be provided between the fuse 54 and the internal primary fuel 46. The external primary fuel 64 may be continuous with and the same as the internal primary fuel 46 or may be different from the internal primary fuel 46. The external primary fuel 64 may be attached to an outside surface of the housing 40 of the delay ignitor cap 10. As shown in FIG. 5, the external primary fuel 64 may be provided as a coil or helix. The external primary fuel 64 may be surrounded by a sheath that prevents combustion of one portion of the external primary fuel 64 from igniting another portion of the external primary fuel 64 and/or from igniting the housing 40. For example, the sheath may prevent one rotation of the coil from igniting another rotation of the coil and/or igniting the housing 40. In this manner, when the fuse 54 ignites the external primary fuel 64, the combustion proceeds along the coil of the external primary fuel 64 to the helix of the internal primary fuel 46 contained within the housing 40 and then on to the secondary fuel 48 as described above.

In the delay ignitor cap 10, the oxygen flows from the thermal lance 1 into the proximal end 36 of the delay ignitor cap 10, axially through the internal primary fuel 46 and the secondary fuel 48, and out of the open distal end 38 of the delay ignitor cap 10.

The inventive delay ignitor cap 10 provides many advantages over the prior art ignition systems.

With self-ignition systems, ignition may not occur if the temperature of the environment or object that the fuse is exposed to is not sufficient for self-ignition, usually above 600° F., or ignition may be premature if the fuse touches a hot surface, is exposed to flames, or is exposed to ambient temperatures greater than the self-ignition temperature. Further, once the fuse is lit, the operator has only 10-15 seconds to get the thermal lance into the correct position and to turn on the oxygen. If the fuse is completely consumed before the oxygen is applied, the lance will not ignite.

With the inventive delay ignitor cap 10, the provision of the external primary fuel 64 and the sheathing of the protected portion 50 of the internal primary fuel 46 allows for increased control of the overall combustion time of the primary fuel 46, 64. The external primary fuel 64 can burn for up to 60 seconds and the positioning of the internal primary fuel 46 assures that there is sufficient heat energy provided after full ignition of the external primary fuel 64 to avoid the ignition being extinguished even after the external primary fuel 64 has completely combusted. The increased combustion time of the primary fuel 46, 64 advantageously allows the operator more time to safely manually ignite the thermal lance 1, position the thermal lance 1, and start the flow of oxygen without risk of the delay ignitor cap 10 self-extinguishing, thereby avoiding lack of ignition or premature ignition of the thermal lance 1.

Combustion requires specific levels of heat (energy), fuel, and oxygen. In the case of thermal lances, initial stages of combustion (ignition) require a specific ratio of each. The overall quantity of fuel available in a thermal lance is pre-determined by the size and design of the components. The quantity of oxygen is variable and determined by oxygen pressure. The quantity of heat energy is variable and determined by the external heat source used for ignition, and the primary fuel and secondary fuel charges. Once combustion has reached a steady state, the combustion reaction generates enough heat energy to continue indefinitely as long as enough oxygen and fuel, which in the case of the thermal lance is the components of the thermal lance themselves, are available.

The combustion reaction is directly related to how much surface area of the fuel is exposed to the required quantities of oxygen and heat energy. During the combustion process, increasing the surface area exposed to oxygen and heat energy will increase the reliability of ignition and increase the efficiency of the combustion reaction through all stages.

With the inventive delay ignitor cap 10, ignition of the fuse 54 begins the ignition and combustion process. As the protected portion 50 of the internal primary fuel 46 combusts, the outer perimeter of the secondary fuel 48 is ignited or superheated. This begins the heat transfer process between the internal primary fuel 46 and the secondary fuel 48. During the nearly instantaneous complete combustion of the unprotected portion 52 of the internal primary fuel 46, heat energy is rapidly generated, causing the remainder of the secondary fuel 48 to ignite and/or continue combusting. The heat energy of the combustion of the secondary fuel 48 then ignites and begins combustion of the components of the thermal lance 1.

The positioning of the internal primary fuel 46 around the secondary fuel 48 increases the amount of heat energy generated by the ignition and combustion of the internal primary fuel 46, increases the surface area of the secondary fuel 48 that is exposed to the heat energy, and increases the probability that the secondary fuel 48 will be successfully ignited. This allows for the use of a secondary fuel 48 with higher ignition energy requirements, for example, metallic shavings or thin strips of aluminum, iron, titanium, magnesium, tungsten, and/or steel; steel wool; wood powder; or wood shavings. Further, the heat transfer efficiency from the internal primary fuel 46 to the secondary fuel 48 is increased because the internal primary fuel 46 surrounds the secondary fuel 48 and the ignition of the unprotected portion 52 of the internal primary fuel 46 is nearly instantaneous.

The positioning of the internal primary fuel 46 and the secondary fuel 48 also increases the efficiency of heat transfer to the components of the thermal lance 1 to ignite the thermal lance 1. The components of the thermal lance 1 require substantial amounts of heat energy to ignite and combust, and the proximity and focal direction of the heat energy generated from both the internal primary fuel 46 and secondary fuel 48 are important. As shown in FIG. 5, the thermal lance 1 is inserted into the recess 58 in the housing 40 of the delay ignitor cap 10, such that the distal end 14 of the thermal lance 1 contacts the secondary fuel 48, in this case, specifically, the plug 62. The distal end 14 of the thermal lance 1 is also in close proximity to the unprotected portion 52 of the internal primary fuel 46.

All of these benefits can be achieved in a compact space, thereby reducing the size and overall footprint of the delay ignitor cap 10.

Figure 7:
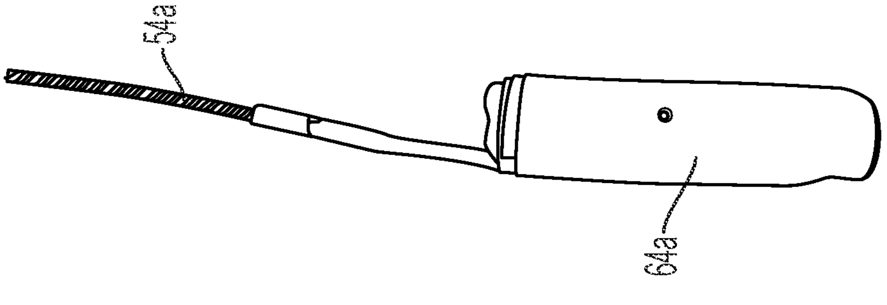
FIG. 7 is a side view after the second step in the production of the delay ignitor cap shown in FIG. 5.
Figure 6:
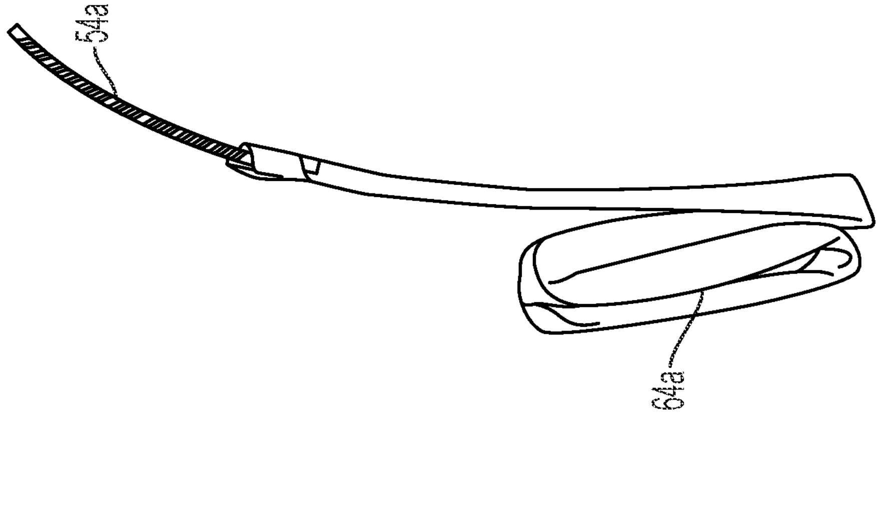
FIG. 6 is a side view during the first step in the production of the delay ignitor cap shown in FIG. 5.

Assembly of the delay ignitor cap 10 can be accomplished as follows (FIGS. 6-14). A length of primary fuel in the form of a protected (sheathed) fuse with an unprotected portion 54*a* to serve as an initiation fuse is wrapped tightly around a mandrel to form a helix or coil (FIG. 6). The rotations of the helix are then joined to one another using any suitable joining material including, but not limited to, tape; plastic wrap; glue; rope or twine; wax; cardboard tubing; or metallic, plastic, or rubber bands, clips, ties, and wires, to form the external primary fuel portion 64*a* of the delay ignitor cap 10 (FIG. 7). The joining material holds the helix/coil shape and provides additional flammable material for combustion.

Figure 9:
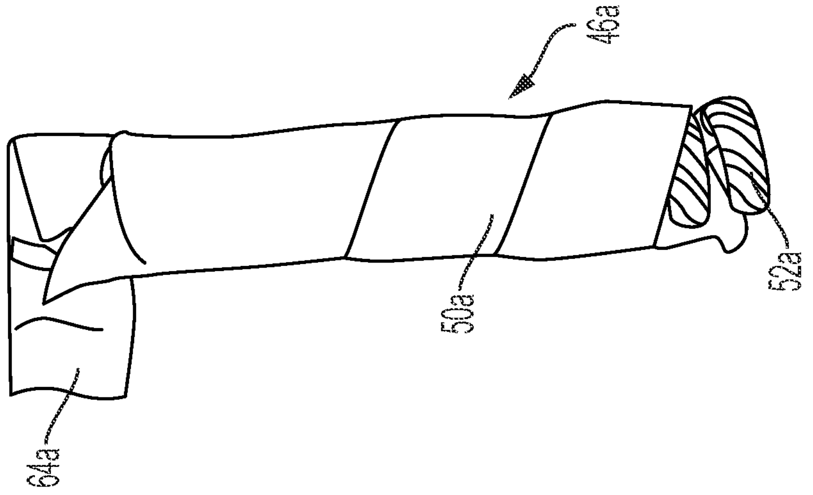
FIG. 9 is a side view after the fourth step in the production of the delay ignitor cap shown in FIG. 5.
Figure 8:
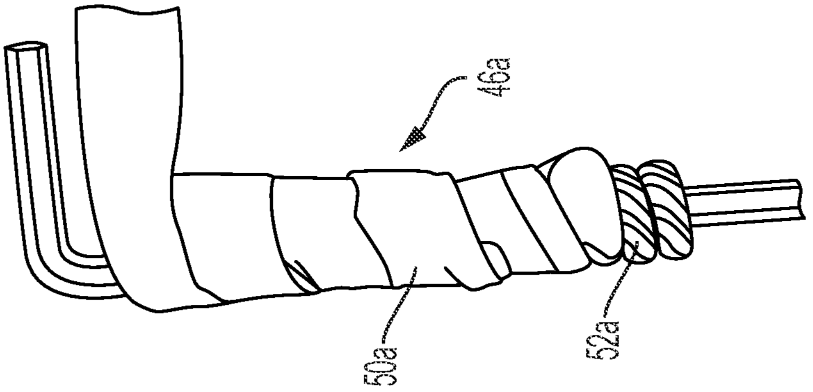
FIG. 8 is a side view during the third step in the production of the delay ignitor cap shown in FIG. 5.

An additional length of the fuse having an unprotected portion 52*a* is wrapped tightly around a mandrel to form a helix or coil which serves as the internal primary fuel portion 46*a* (FIG. 8). The rotations of the helix are then joined to one another using any suitable joining material including, but not limited to, tape; plastic wrap; glue; rope or twine; wax; cardboard tubing; metallic, plastic, or rubber bands, clips, ties, and wires, to form the internal primary fuel portion 46*a* of the delay ignitor cap 10 (FIG. 9).

Figure 12:
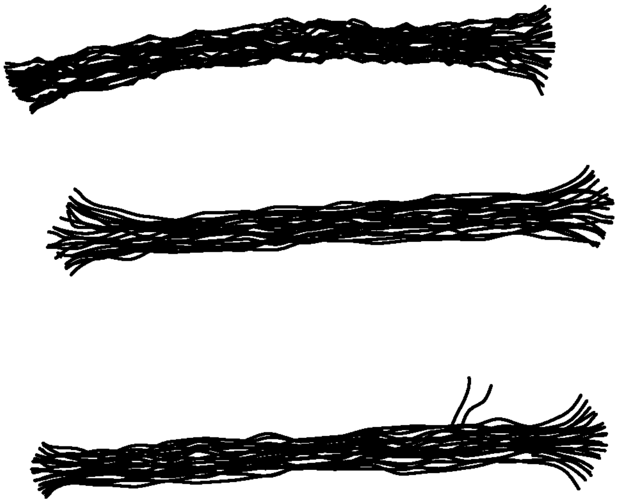
FIG. 12 is a side view of the secondary fuel used in the production of the delay ignitor cap shown in FIG. 5.

Steel wool rolls are provided as the secondary fuel (FIG. 12). The steel wool may be grade 001. However, steel wool of any grade may be used with finer grades being more preferable.

Figure 11:
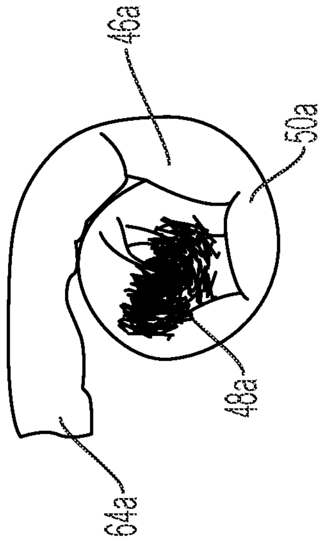
FIG. 11 is a distal end view after the fourth step in the production of the delay ignitor cap shown in FIG. 5.
Figure 10:
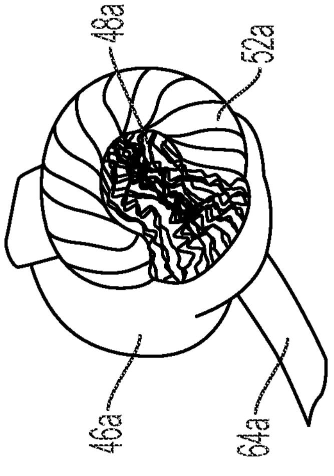
FIG. 10 is a proximal end view after the fourth step in the production of the delay ignitor cap shown in FIG. 5.

The steel wool rolls are inserted into the center passageway of the internal primary fuel portion 46*a*, and then the internal primary fuel portion 46*a* is inserted into a tube 40*a* (FIGS. 10 and 11).

Figure 14:
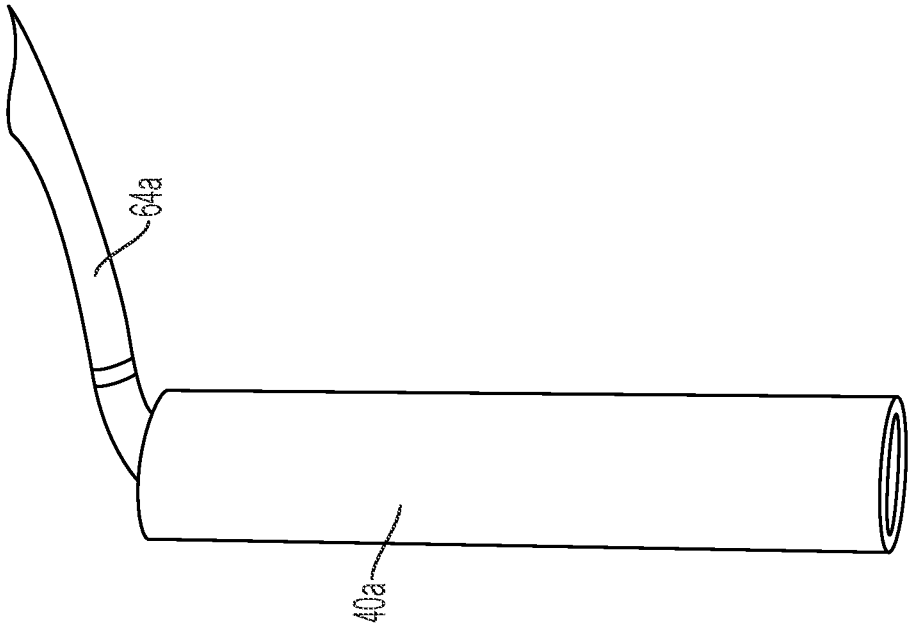
FIG. 14 is a side view after the fifth step in the production of the delay ignitor cap shown in FIG. 5.
Figure 13:
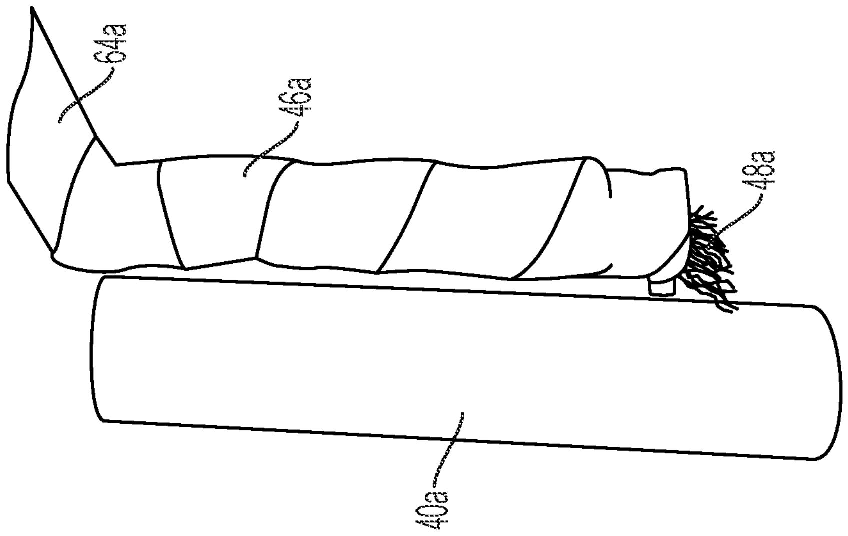
FIG. 13 is a side view just prior to the fifth step in the production of the delay ignitor cap shown in FIG. 5.

The tube 40*a* is used as the housing of the delay ignitor cap 10 (FIG. 13). The internal primary fuel portion 46*a* is inserted into the tube 40*a* and secured into place using any suitable joining material including, but not limited to, tape; plastic wrap; glue; rope or twine; wax; cardboard tubing; metallic, plastic, or rubber bands, clips, ties, and wires (FIG. 14). A recess for receiving the thermal lance 1 is left at the proximal end 60*a* of the tube 40*a*.

An additional steel wool roll is compacted and inserted into the proximal end 60*a* of the tube 40*a*. A tool may be used to gently compress the additional steel wool into the unprotected portion 52*a* of the internal primary fuel portion 46*a*. The delay ignitor cap 10 is then ready for attachment to the thermal lance 1.

Any combination of one or more of the advantageous features of the delay ignitor cap 10 may be incorporated into the blowback ignitor cap 100 to form a combination ignitor cap 200. One embodiment of a combination ignitor cap 200 is shown in FIGS. 15 and 16. The combination ignitor cap 200 includes features of both the delay ignitor cap 10 and the blowback ignitor cap 100.

The combination ignitor cap 200 comprises a proximal end 236, a distal end 238, a housing 240 having a sidewall 242 extending from the proximal end 236 to the distal end 238 and defining a passageway 244, and internal primary fuel 246 and secondary fuel 248 disposed within the passageway 244 of the housing 240. The internal primary fuel 246 and the secondary fuel 248 may be any suitable combustible materials capable of ignition in the presence of oxygen including, but not limited to, fireworks fuse; artillery fuse; metallic powders of aluminum, iron, titanium, magnesium, tungsten, and/or steel; non-metallic powders of wood, plastic, and/or synthetic material; metallic shavings or thin strips of aluminum, iron, titanium, magnesium, tungsten, and/or steel; steel wool, synthetic or organic foam; synthetic or organic textile; and a chemical mixture composed of a high energy oxidizer and fuel. The internal primary fuel 246 and/or the secondary fuel 248 are porous to allow oxygen from the thermal lance 1 to flow from the proximal end 236 of the combination ignitor cap 200 to the distal end 238 of the combination ignitor cap 200 when the combination ignitor cap 200 is attached to the thermal lance 1.

A distal end 266 of the housing 240 is substantially sealed and is provided with an opening 268 that allows a fuse 254 to pass therethrough. The distal end 266 of the housing 240 may be sealed in any suitable manner that substantially prevents oxygen flowing from the proximal end 236 of the combination ignitor cap 200 to the distal end 238 of the combination ignitor cap 200 from flowing out of the distal end 266 of the housing 240 of the combination ignitor cap 200.

A plug or cap 270 may cover the distal end 266 of the housing 240 of the combination ignitor cap 200, such that the distal end 266 of the housing 240 is sealed. The plug 270 may be made of any suitable combustible material that can be secured tightly to the distal end 266 of the housing 240. Such materials include, but are not limited to, steel, stainless steel, iron, wood, cardboard, rubber, cork, plastic, tape, and other metallic, synthetic, or organic material.

Alternatively, the distal end 266 of the housing 240 of the combination ignitor cap 200 may be sealed by forming, crimping, welding, riveting, hammering, or bending.

A recess 258 for receiving the thermal lance 1 is provided in a proximal end 260 of the housing 240 of the combination ignitor cap 200. An attachment ring 272 having a central opening 274 for receiving the thermal lance 1 is provided in the recess 258 of the housing 240. The attachment ring 272 includes at least one opening 276 that allows oxygen to flow through the attachment ring 272 and between the thermal lance 1 and the housing 240 of the combination ignitor cap 200.

At least one opening 276 in the attachment ring 272 may be provided as a hole or aperture passing through the attachment ring 272 or the attachment ring 272 may be segmented with an opening 276 provided between the segments. When a plurality of openings 276 are provided, the openings 276 may be equally spaced around the attachment ring 272, for example, at 180° (2 openings), 120° (3 openings), 90° (4 openings), or 45° (8 openings), or may be provided at different distances from one another.

The total surface area of the openings 276 in the attachment ring 272 is larger than any gap between the fuse 254 and the opening 268 in the distal end 266 of the housing 240, so the majority of the oxygen exits through the proximal end 236 of the combination ignitor cap 200 and along the outer surface of the outer housing 16 of the thermal lance 1.

The attachment ring 272 may be made of any suitable material that allows for the attachment of the attachment ring 272 to the housing 240 of the combination ignitor cap 200 and the outer housing 16 of the thermal lance 1. Such materials include metals, organics, plastic, ceramics, and rubbers. The attachment of the attachment ring 272 to the housing 240 of the combination ignitor cap 200 and the outer housing 16 of the thermal lance 1 may be accomplished by any suitable method that assures that the combination ignitor cap 200 will not be detached from or move with respect to the thermal lance 1 by the gas pressure of the oxygen impacting the sealed distal end 266 of the housing 240 of the combination ignitor cap 200 or by the combination ignitor cap 200 impacting a solid object. Such methods include, but are not limited to, welding, crimping, pressing, pinning, riveting, rubber inserts, metallic inserts, springs, clips, pins, interlocking geometric shapes, and corresponding threaded connections.

Within the housing 240, the internal primary fuel 246 surrounds the secondary fuel 248. As shown in FIGS. 15 and 16, the secondary fuel 248 may be a central core within the passageway 244 of the housing 240 and the internal primary fuel 246 may be provided in the form of a helix or coil that is positioned between the sidewall 242 of the housing 240 and the secondary fuel 248 and surrounds the secondary fuel 248. The rotations of the helix may be wound such that the rotations are spaced apart or such that the rotations of the helix contact one another. As an example, as shown in FIGS. 15 and 16, the rotations of the helix in the protected portion 250 of the internal primary fuel 246 may be spaced apart from one another while the rotations of the unprotected portion 252 of the internal primary fuel 246 may contact one another.

The secondary fuel 248 may comprise more than one portion. For example, as shown in FIGS. 15 and 16, the secondary fuel 248 may comprise two or more substantially cylindrical portions extending in the longitudinal direction of the passageway 244 of the housing 240. Alternatively, the internal primary fuel 246 may completely fill the space between the sidewall 242 of the housing 240 and the secondary fuel 248 and/or the secondary fuel 248 may be a material that completely fills a space within the housing 240 defined by the internal primary fuel 246.

The fuse 254 may be manually ignited using a torch, a lighter, a hot element, or any other suitable ignition source or may be spontaneously ignited when exposed to temperatures or surfaces above the auto-ignition temperature of the fuse 254 to start combustion of the internal primary fuel. Combustion of the internal primary fuel 246 proceeds along a path through the internal primary fuel 246, and when combusting internal primary fuel 246 comes into contact with the secondary fuel 248, the secondary fuel 248 is ignited and starts to combust.

The protected portion 250 of the internal primary fuel 246 may be separated from the secondary fuel 248 by a sheath that prevents and/or reduces cross-ignition of the internal primary fuel 246 with the secondary fuel 248 while still allowing the secondary fuel 248 to be heated by the combustion of the protected portion 250 of the internal primary fuel 246. The unprotected portion 252 of the internal primary fuel 246 is directly in contact with the secondary fuel 248, such that ignition and combustion of the unprotected portion 252 of the internal primary fuel 246 ignites of the secondary fuel 248. The protected portion 250 of the internal primary fuel 246 may also prevent the entirety of the internal primary fuel 246 from igniting at the same time. For example, when the internal primary fuel 246 is a helix, as shown in FIGS. 15 and 16, the sheath surrounding the protected portion 250 of the internal primary fuel 246 contains the ignition and combustion of the internal primary fuel 246 such that ignition and combustion of the internal primary fuel 246 follows the path of the helix and does not jump from one rotation of the helix to an adjacent rotation of the helix. Once the combustion of the internal primary fuel 246 reaches the unprotected portion 252 of the internal primary fuel 246, cross-ignition of all of the rotations of the helix of the unprotected portion 252 can occur at the same time and ignite the secondary fuel 248.

The protected portion 250 of the internal primary fuel 246 may be a higher volume of fuel than the unprotected portion 252 of the internal primary fuel 246. For example, when the internal primary fuel 246 is a helix or coil, as shown in FIGS. 15 and 16, the protected portion 250 of the internal primary fuel 246 includes more rotations of the helix than the unprotected portion 252 of the internal primary fuel 246.

The housing 240 may be made of any suitable combustible material that has the structural integrity to contain the internal primary fuel 246 and the secondary fuel 248 and attach the combination ignitor cap 200 to the thermal lance 1. Such materials include, but are not limited to, a phenolic resin, cardboard, plastic, low carbon steel, high carbon steel, stainless steel, and fiberglass.

As shown in FIGS. 15 and 16, a plug 262 of the secondary fuel 248 may fill the passageway 244 of the housing 240 and act as a divider between the fuel 246, 248 of the combination ignitor cap 200 and the distal end 14 of the thermal lance 1.

Optionally, external primary fuel 264 may be provided between the fuse 254 and the internal primary fuel 246. The external primary fuel 264 may be continuous with and the same as the internal primary fuel 246 or may be different from the internal primary fuel 246. The external primary fuel 246 may be attached to an outside surface of the housing 240 of the combination ignitor cap 200. As shown in FIGS. 15 and 16, the external primary fuel 264 may be provided as a coil or helix. The external primary fuel 264 may be surrounded by a sheath that prevents combustion of one portion of the external primary fuel 264 from igniting another portion of the external primary fuel 264 and/or from igniting the housing 240. For example, the sheath may prevent one rotation of the coil from igniting another rotation of the coil and/or igniting the housing 240. In this manner, when the fuse 254 ignites the external primary fuel 264, the combustion proceeds along the coil of the external primary fuel 264 to the helix of the internal primary fuel 246 contained within the housing 240 and then on to the secondary fuel 248 as described above.

Optionally, a tertiary fuel 280 may be provided between the central core 28 and the outer housing 16 of the thermal lance 1 where the tertiary fuel 280 is intermingled with the components of the thermal lance 1. The tertiary fuel 280 may have a higher energy density than the secondary fuel 248 and/or a lower initial energy requirement for combustion than the components of the thermal lance 1. The tertiary fuel 280 may be, for example, compressed metallic flakes, shavings, steel wool, non-metallic powders of wood, plastic or synthetic material, high-density synthetic or organic foam, or high-density synthetic or organic textile. The tertiary fuel 280 is ignited by the combustion of the secondary fuel 248 and assists in ignition of the components of the thermal lance 1.

The combination ignitor cap 200 provides all of the advantages of both the delay ignitor cap 10 and the blowback ignitor cap 100.

Whereas particular aspects of this invention have been described above for purposes of illustration, it will be evident to those skilled in the art that numerous variations of the details of the present invention may be made without departing from the invention.

The invention claimed is:

1. An ignitor cap for a thermal lance comprising:
- a proximal end adapted to receive the thermal lance;
- a distal end;
- a housing having a sidewall extending from the proximal end to the distal end and defining a passageway; and
- internal primary fuel and secondary fuel disposed within the passageway of the housing, at least a portion of the internal primary fuel in contact with the secondary fuel,
- wherein the distal end of the ignitor cap is substantially sealed and the proximal end of the ignitor cap includes at least one opening such that, when the thermal lance is received in the proximal end of the ignitor cap, gas flows from the thermal lance into the proximal end of the ignitor cap, axially through the internal primary fuel and the secondary fuel, and is then redirected by the sealed distal end of the housing back through the internal primary fuel and the secondary fuel and out through the at least one opening and along an exterior surface of the thermal lance.

2. The ignitor cap of claim 1, further comprising an opening in the distal end through which a fuse passes.

3. The ignitor cap of claim 2, wherein a total surface area of the at least one opening is larger than any gap between the fuse and the opening in the distal end.

4. The ignitor cap of claim 1, further comprising a plug covering the distal end of the ignitor cap thereby substantially sealing the distal end of the ignitor cap.

5. The ignitor cap of claim 1, further comprising an attachment ring that includes or defines the at least one opening.

6. The ignitor cap of claim 5, wherein the attachment ring has a central opening for receiving the thermal lance.

7. The ignitor cap of claim 5, wherein the at least one opening is a hole or aperture passing through the attachment ring.

8. The ignitor cap of claim 5, wherein the attachment ring is segmented with the at least one opening being provided between the segments.

9. The ignitor cap of claim 1, further comprising a recess in the proximal end of the housing for receiving the thermal lance, such that a distal end of the thermal lance is adjacent to or contacts the internal primary fuel and/or the secondary fuel.

10. The ignitor cap of claim 1, further comprising a porous barrier filling a portion of the passageway of the housing and acting as a divider between the internal primary fuel and/or secondary fuel and a distal end of the thermal lance when the thermal lance is received in the ignitor cap.

11. The ignitor cap of claim 1, wherein the internal primary fuel surrounds the secondary fuel.

12. The ignitor cap of claim 1, wherein the internal primary fuel and/or the secondary fuel are porous or include openings to allow gas to flow from the proximal end of the ignitor cap to the distal end of the ignitor cap when the ignitor cap is attached to the thermal lance.

13. The ignitor cap of claim 1, wherein the secondary fuel is a central core
- within the passageway of the housing and the internal primary fuel is provided in the form of
- a helix or coil that is positioned between the sidewall of the housing and the secondary fuel and
- surrounds the secondary fuel.

14. The ignitor cap of claim 1, wherein the internal primary fuel comprises a protected portion that is separated from the secondary fuel by a sheath that prevents and/or reduces cross-ignition of the internal primary fuel with the secondary fuel, and an unprotected portion that is directly in contact with the secondary fuel.

15. The ignitor cap of claim 14, wherein the protected portion of the internal primary fuel has a higher volume of fuel than the unprotected portion of the internal primary fuel.

16. The ignitor cap of claim 2, further comprising external primary fuel provided on an exterior of the housing between the fuse and the internal primary fuel.

17. The ignitor cap of claim 16, wherein the external primary fuel is surrounded by a sheath that prevents combustion of one portion of the external primary fuel from igniting another portion of the external primary fuel and/or from igniting the housing.

18. A thermal lance system comprising:
- the ignitor cap of claim 1; and
- a thermal lance,
- wherein a distal end of the thermal lance is received in a proximal end of the ignitor cap.

19. The thermal lance system of claim 18, wherein a tertiary fuel is provided in the thermal lance adjacent the secondary fuel of the ignitor cap.

20. The thermal lance system of claim 19, wherein the tertiary fuel has a higher energy density than the secondary fuel and/or a lower initial energy requirement for combustion than components of the thermal lance.

21. An ignitor cap for a thermal lance comprising:
- a proximal end adapted to receive the thermal lance;
- a distal end;
- a housing having a sidewall extending from the proximal end to the distal end and defining a passageway; and internal primary fuel and secondary fuel disposed within the passageway of the housing, at least a portion of the internal primary fuel in contact with the secondary fuel, wherein the secondary fuel is a central core within the passageway of the housing and the internal primary fuel is provided in the form of a helix or coil that is positioned between the sidewall of the housing and the secondary fuel and surrounds the secondary fuel.

22. The ignitor cap of claim 21, further comprising an opening in the distal end through which a fuse passes.

23. The ignitor cap of claim 21, further comprising a plug covering the distal end of the ignitor cap thereby substantially sealing the distal end of the ignitor cap.

24. The ignitor cap of claim 21, further comprising a recess in the proximal end of the housing for receiving the thermal lance, such that a distal end of the thermal lance is adjacent to or contacts the internal primary fuel and/or the secondary fuel.

25. The ignitor cap of claim 21, wherein the internal primary fuel surrounds the secondary fuel.

26. The ignitor cap of claim 21, wherein the internal primary fuel and/or the secondary fuel are porous or include openings to allow gas to flow from the proximal end of the ignitor cap to the distal end of the ignitor cap when the ignitor cap is attached to the thermal lance.

27. The ignitor cap of claim 21, wherein the internal primary fuel comprises a protected portion that is separated from the secondary fuel by a sheath that prevents and/or reduces cross-ignition of the internal primary fuel with the secondary fuel, and an unprotected portion that is directly in contact with the secondary fuel.

28. The ignitor cap of claim 27, wherein the protected portion of the internal primary fuel has a higher volume of fuel than the unprotected portion of the internal primary fuel.

29. The ignitor cap of claim 22, further comprising external primary fuel provided on an exterior of the housing between the fuse and the internal primary fuel.

30. The ignitor cap of claim 29, wherein the external primary fuel is surrounded by a sheath that prevents combustion of one portion of the external primary fuel from igniting another portion of the external primary fuel and/or from igniting the housing.

31. A thermal lance system comprising:

the ignitor cap of claim 21; and a thermal lance, wherein a distal end of the thermal lance is received in a proximal end of the ignitor cap.

* * * * *